United States Patent
Lee

(10) Patent No.: US 7,415,293 B1
(45) Date of Patent: Aug. 19, 2008

(54) METHOD FOR SAVING BATTERY POWER CONSUMPTION BY CONTROLLING THE DISPLAY OF A PORTABLE TELEPHONE

(75) Inventor: Youn-Man Lee, Kumi-shi (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 272 days.

(21) Appl. No.: 09/621,384

(22) Filed: Jul. 21, 2000

(30) Foreign Application Priority Data

Jul. 21, 1999 (KR) ............................... 1999-29511

(51) Int. Cl.
*H04B 1/38* (2006.01)
(52) U.S. Cl. ...................................... 455/574
(58) Field of Classification Search ................. 455/574, 455/575, 566, 572, 38.3, 159.1, 550, 343, 455/407, 127, 571, 557
See application file for complete search history.

(56) References Cited

U.S. PATENT DOCUMENTS

| | | | | |
|---|---|---|---|---|
| 5,010,566 A * | 4/1991 | Seo | | 379/61 |
| 5,881,377 A * | 3/1999 | Giel et al. | | 455/343 |
| 5,898,933 A * | 4/1999 | Kaschke | | 455/575.7 |
| 6,058,320 A * | 5/2000 | Yokota | | 455/574 |
| 6,119,023 A * | 9/2000 | Tomiyori | | 455/574 |
| 6,141,568 A * | 10/2000 | Sakaguchi | | 455/566 |
| 6,246,888 B1 * | 6/2001 | Tsuchiyama | | 455/566 |
| 6,278,887 B1 * | 8/2001 | Son et al. | | 455/407 |
| 6,292,676 B1 * | 9/2001 | Ozaki et al. | | 455/566 |
| 6,317,593 B1 * | 11/2001 | Vossler | | 455/414.1 |
| 6,349,221 B1 * | 2/2002 | Wolf et al. | | 455/566 |
| 6,381,476 B1 * | 4/2002 | Yoshida | | 455/566 |
| 6,389,280 B1 * | 5/2002 | Mittelstadt et al. | | 455/418 |
| 6,473,628 B1 * | 10/2002 | Kuno et al. | | 455/566 |
| 6,522,900 B1 * | 2/2003 | Cho | | 455/572 |
| 6,647,278 B2 * | 11/2003 | Mitten et al. | | 455/567 |
| 6,763,238 B1 * | 7/2004 | Okano | | 455/456.4 |

FOREIGN PATENT DOCUMENTS

CN 1177897 A1 4/1998

\* cited by examiner

*Primary Examiner*—Melody Mehrpour
(74) *Attorney, Agent, or Firm*—Cha & Reiter, LLC

(57) ABSTRACT

A battery saving method of controlling the display of a portable telephone is disclosed. The method comprises checking whether a user inputs a SEND key for a call origination to establish a call or an answering key in response to an incoming call; turning off the power supplied to the display when a call is set up according to the SEND key or the answering key; and, turning on the power supplied to the display when the call is terminated. Further, the display is turned off after a predetermined period of time has elapsed after the SEND key or the answering key is activated.

18 Claims, 3 Drawing Sheets

METHOD FOR SAVING BATTERY POWER CONSUMPTION BY CONTROLLING THE DISPLAY OF A PORTABLE TELEPHONE

CLAIM OF PRIORITY

This application makes reference to and claims all benefits accruing under 35 U.S.C. Section 119 from an application entitled "Method for Saving Battery by Controlling Display in Portable Telephone" filed in the Korean Industrial Property Office on Jul. 21, 1999 and there duly assigned Serial No. 99-29511.

BACKGROUND OF THE INVENTION

1. Field of the Invention

The present invention relates generally to a portable telephone, and more particularly, to a method for saving battery power consumption by turning off the display unit of the portable telephone during a call connection.

2. Description of the Related Art

If the battery of a portable telephone has to be replaced frequently, it imposes a significant limitation on the usage of the portable telephone. Thus, it is desirable to provide a portable telephone with longer usage time by a given battery. Accordingly, the technology has evolved to contrive new novel batteries that are superior and have a longer lasting lifetime. In addition to the development of the battery technology, many studies have been made on various methods of saving battery power by minimizing power consumption of the portable telephone.

Normally, a user holds the portable telephone to his/her ear during a call connection. Although the user does not pay attention to the display unit of the portable telephone during the conversation, the display unit is turned on in the existing portable telephone. In such a case, the display unit unnecessarily consumes the battery power even though the user does not and can not watch the display unit of the portable telephone during the call connection.

SUMMARY OF THE INVENTION

It is, therefore, an object of the present invention to provide a method for saving a battery lifetime by controlling the display of a portable telephone in which the display is turned off during a call in order to prevent unnecessary power consumption.

To achieve the above object of the present invention, there is provided a battery saving method of controlling the display unit of a portable telephone. The method comprises checking whether a user inputs a SEND key for a call origination or an answering key in response to an incoming call; turning off the display when a call is set up according to the activation of the SEND key or the answering key; and, turning on the display when the call is terminated.

According to one aspect of the invention, the display is turned off when a predetermined period of time has elapsed after the activation of the SEND key or the answering key.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described below with reference to the accompanying drawings. For the purpose of clarity, well-known functions or constructions are not described in detail as they would obscure the invention in unnecessary detail.

Figure 1:
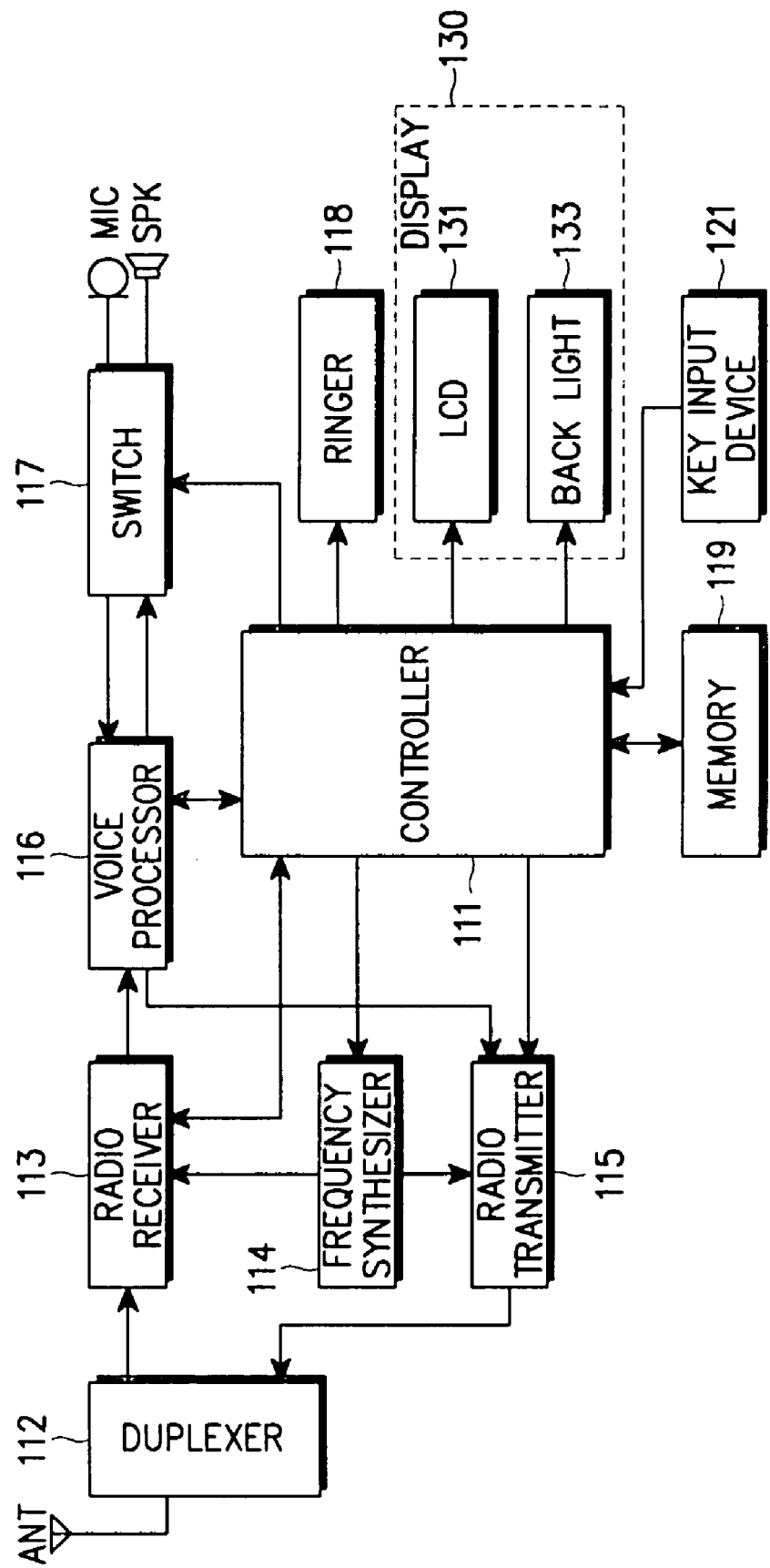
FIG. 1 is a block diagram illustrating a portable telephone according to the embodiment of the present invention.

FIG. 1 shows a block diagram of a portable telephone according to the embodiment of the present invention. With reference to FIG. 1, a controller 111 controls the entire operation of the portable telephone, specifically the operating voltage supplied to the display unit according to the embodiment of the present invention. A duplexer 112 receives a radio signal from an antenna ANT and provides the received radio signal to a radio receiver 113. Similarly, the duplexer 112 transmits a transmission signal received from a radio transmitter 115 via the antenna ANT. The radio receiver 113 provides input data to the controller 111 during a data communication mode and provides an input audio signal to a voice processor 116 during a conversation mode. A frequency synthesizer 114 generates a local oscillation signal for demodulating the received signal under the control of the controller 111. Also, the frequency synthesizer 114 generates a transmission carrier signal and provides the generated transmission carrier signal to the radio transmitter 115. The radio transmitter 115 mixes the sound signal received from the voice processor 116 with the carrier signal received from the frequency synthesizer 114 and outputs the mixed signals to the duplexer 112 under the control of the controller 111 during the conversation mode. The voice processor 116 demodulates the coded audio signal received from the radio receiver 113 and outputs the demodulated audio signal to a speaker SPK via a switch 117. Also, the voice processor 116 receives the electrical audio signal from a microphone MIC via the switch 117, encodes the electrical audio signal, and outputs the coded audio signal to the radio transmitter 115.

A ringer 118 generates a ring tone upon receiving a ring signal under the control of the controller 111. A memory 119 stores the control program of the controller 111. The memory 119 includes a Read Only Memory (ROM) for storing various programs, a Non-Volatile Memory (NVM) for storing telephone numbers and names, and a Random Access Memory (RAM) for temporarily storing data generated during the execution of the programs.

A key input device 121, a key matrix, has numeric keys for dialing and contains various functional keys. The key input device 121 generates a key input signal corresponding to the key selected by a user and provides the generated key input signal to the controller 111. A display 130 includes a Liquid Crystal Display (LCD) 131 and a back light 133. The display 130 displays the operating status of the portable telephone and is turned on/off under the control of the controller 111.

Figure 2:
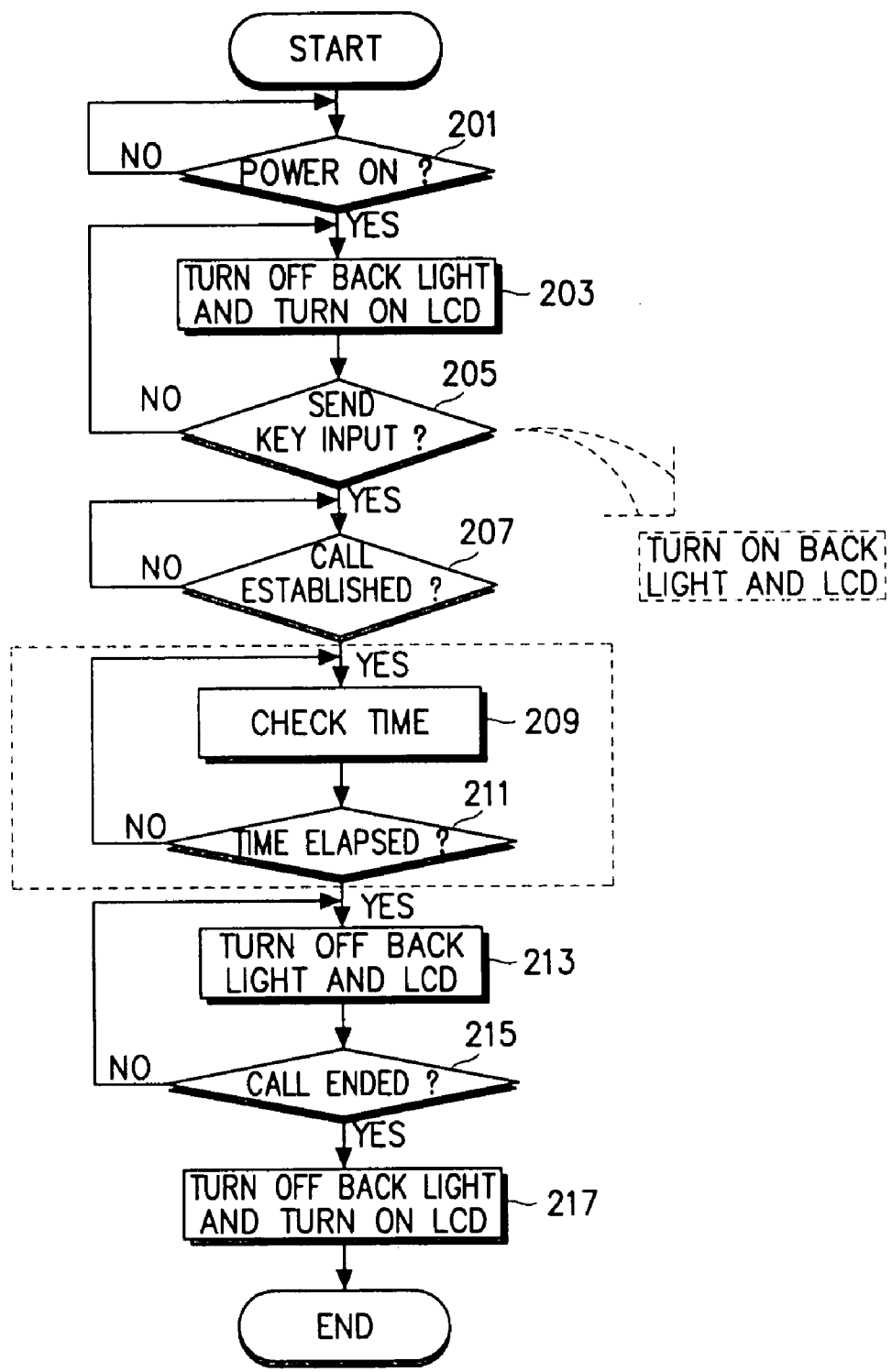
FIG. 2 is a flow chart illustrating a procedure for controlling the operation of an LCD during a call origination according to the embodiment of the present invention; and, FIG. 3 is a flow chart illustrating a procedure for controlling the operation of the LCD during a call termination according to the embodiment of the present invention.
Figure 3:
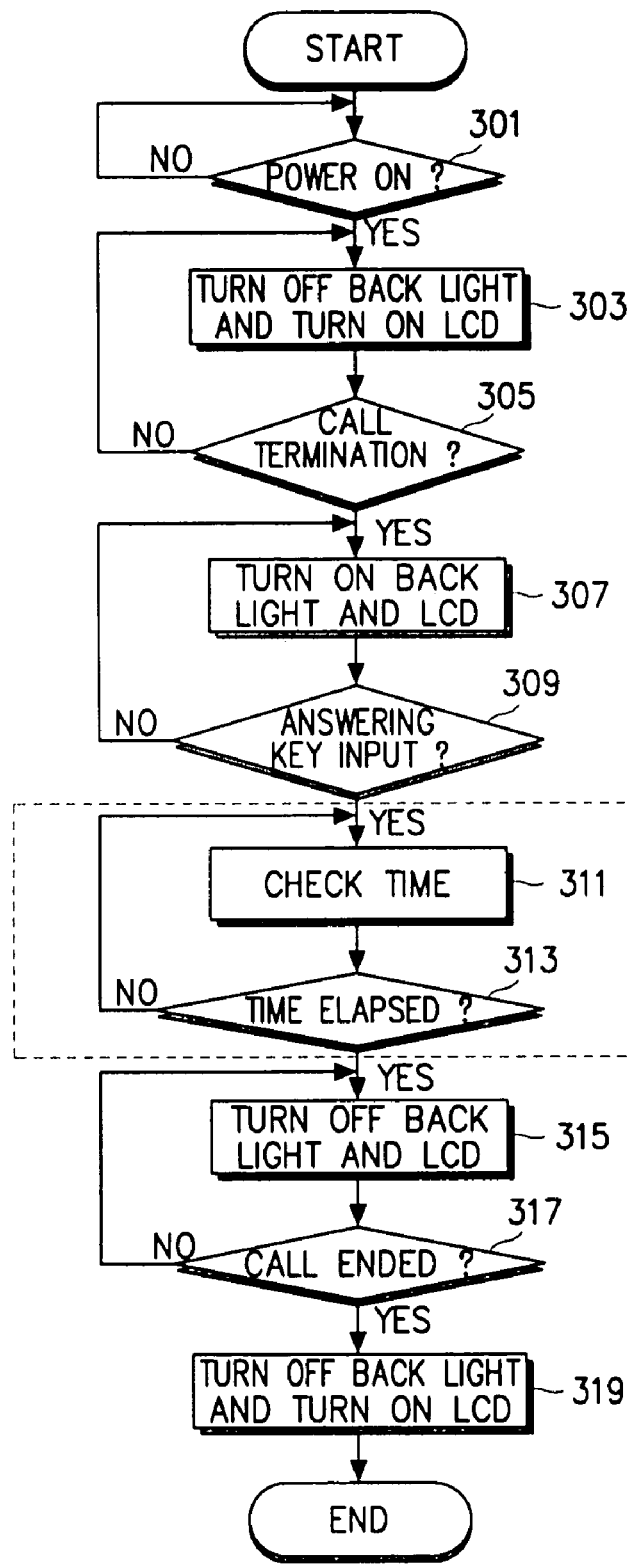

FIG. 2 shows a procedure for controlling the operation of the LCD during a call origination according to the embodiment of the present invention, and FIG. 3 shows a procedure for controlling the operation of the LCD during a call termination according to the embodiment of the present invention.

First, with reference to FIG. 2, a detailed description will be made as to how to control the LCD power of the portable telephone during a call origination according to the present invention.

Upon having the power-on in step 201, the controller 111 turns on the LCD 131 while the back light 133 of the display 130 is turned off in step 203. During the on-state, the LCD 131 and the back light 133 are provided with the operating voltage from a battery (not shown), whereas during the off-state, the LCD 131 and the back light 133 are not provided with the operating voltage from the battery.

Then, the controller 111 checks in step 205 whether the user inputs (or presses) a SEND key for a call origination using the key input device 121. When the SEND key is inputted, the controller 111 turns on the back light 133 for a predetermined period of time and maintains the on-state of the LCD 131. Otherwise, when the SEND key is not inputted, the controller 111 returns to step 203 to maintain the on-state of the LCD 131 and the off-state of the back light 133.

After step 205, the controller 111 checks, in step 207, whether a call is set up or not. When the call is set up, the controller 111 proceeds to step 213. Alternatively, the controller 111 may proceed to steps 209 and 211 prior to proceeding to step 213. In step 209, the controller 111 checks whether a predetermined period of time has elapsed. If it is determined in step 211 that the predetermined period of time has elapsed, the controller 111 proceeds to step 213. Here, the predetermined period of time is defined as a time period required for the user to hold his/her portable telephone to his/her ear after dialing the phone number to make a call. In a normal usage behavior, a portable phone user presses the SEND key for a call origination then holds the portable telephone to his/her ear waiting for the call connection with the receiving party. Thus, the time required for this operation is arbitrarily determined.

Thereafter, in step 213, the controller 111 cuts off the operating voltage supplied to the LCD 131 and the back light 133 in order to turn off the LCD 131 and the back light 133. This is done to save the battery power by reducing the power consumption that is unnecessary to drive the display 130 during a conversation as the portable telephone is held to the user's ear that is out of the user's sight and the user does not and can not pay attention to the display 130.

When the user ends the call by pressing the END key in step 215 during which the display 130 is turned off, the controller 111 turns back the power supplied to the LCD 131 but maintains the turn-off state of the back light 133 in step 217.

Next, a detailed description will be made as to how to control the LCD power during a call termination with reference to FIG. 3.

Upon turning the power-on in step 301, the controller 111 turns on the LCD 131 and turns off the back light 133 of the display 130 in step 303. Then, the controller 111 checks in step 305 whether a ring signal for call termination is received. Upon detection of the ring signal, the controller 111 turns on the back light 133 for a predetermined period of time and maintains the on-state of the LCD 131, in step 307. At the same time, the controller 111 raises a call termination alarm. Otherwise, if the ring signal is not detected, the controller 111 returns to step 303 to maintain the on-state of the LCD 131 and the off-state of the back light 133.

After step 307, the controller 111 checks in step 309 whether the user inputs a call answering key using the key input device 121 or other mechanism to receive the incoming call. When the call answering key is inputted, the controller 111 proceeds to step 315. Alternatively, the controller 111 may proceed to steps 311 and 313 prior to step 315. In step 311, the controller 111 checks whether a predetermined period of time has elapsed. If it is determined in step 313 that the predetermined period of time has elapsed, the controller 111 proceeds to step 315. Here, the predetermined period of time is defined as a time period required for the user to hold the portable telephone to his/her ear to receive an incoming call. Normally, the user activates the ANSWER key or other equivalent mechanism to receive a call termination then hold the portable telephone to his/her ear. Here, the time required for this operation is arbitrarily determined.

In step 315, the controller 111 cuts off the operating voltage supplied to the LCD 131 and the back light 133 in order to turn off the LCD 131 and the back light 133. This is done to save battery power by reducing the power consumption that is unnecessary to drive the display 130 as the portable telephone is held to the user's ear during the call and the user can not pay attention to the display 130 of the portable telephone.

When the user ends the call by pressing the END key in step 317, during which the display 130 is turned off, the controller 111 turns on the LCD 131 but maintains the turn-off state of the back light 133, in step 319.

The invention has been described with reference to the embodiment in which the operating voltage of the LCD 131 and the back light 133 are controlled during the call. However, when using an ear-microphone or a speaker phone, the portable telephone may continuously provide the operating voltage to the LCD 131 during the call.

As described above, the present invention gives an advantage of saving the battery power by cutting off the operating voltage supplied to the display when not in use during the call. While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A battery saving method for controlling a display of a portable telephone, comprising:
   providing said display with a liquid crystal display (LCD); and,
   after power-on of the telephone, maintaining the LCD on until a call is established and a predetermined time period has expired since establishment.

2. The method of claim 1, further comprising;
   providing a backlight for the LCD; and,
   if there has been no call since power-on, maintaining the back light off as long as no call is placed or received.

3. The method of claim 2, wherein said telephone includes a send key, an answering key and a plurality of other input keys, and wherein the maintaining of the back light off persists unless and until one of two events occurs, the two events being pressing the send key and receiving a ring signal for call termination.

4. The method of claim 3, further comprising turning off the backlight upon the expiration of said period.

5. The method of claim 4, further comprising turning on the LCD when the established call has ended.

6. The method of claim 5, further comprising maintaining, if there has been a call since power-on, the back light off as long as no call is placed, or received, subsequent to the most recent call.

7. The method of claim 1, further comprising:
   providing said display with a back light for the LCD; and,
   if there has been a call since power-on, maintaining the back light off as long as no call is placed, or received, subsequent to the most recent call.

8. The method of claim 1, wherein said telephone includes a send key and an answering key, respectively, for placing and answering phone calls, and further includes a plurality of other input keys.

9. A computer program product having a computer readable medium in which is embeddable a program having instructions executable by a processor for performing the method of claim 1.

10. A portable telephone, comprising:
a display that includes a liquid crystal display (LCD); and
a processor configured for, after power-up of the telephone, maintaining the LCD on until a call is established and a predetermined time period has expired since establishment.

11. The telephone of claim 10, further comprising a back light for the LCD, wherein said processor is configured for, if there has been no call since power-on, maintaining the back light off as long as no call is placed or received.

12. The telephone of claim 11, further comprising a send key, an answering key and a plurality of other input keys, wherein the maintaining of the back light off persists unless and until one of two events occurs, the two events being pressing the send key and receiving a ring signal for call termination.

13. The telephone of claim 12, wherein said processor is further configured for maintaining the LCD on until a call is established and a predetermined time period has expired since establishment.

14. The telephone of claim 13, wherein said processor is further configured for turning off the backlight upon the expiration of said period.

15. The telephone of claim 14, wherein said processor is further configured for turning on the LCD when the established call has ended.

16. The telephone of claim 15, wherein said processor is further configured for maintaining, if there has been a call since power-on, the back light off as long as no call is placed, or received, subsequent to the most recent call.

17. The telephone of claim 10, comprising a back light for the LCD, wherein said processor is further configured for maintaining, if there has been a call since power-on, the back light off as long as no call is placed, or received, subsequent to the most recent call.

18. The telephone of claim 10, wherein said processor is further configured for maintaining the LCD on until a call is established and a predetermined time period has expired since establishment.

* * * * *